United States Patent [19]
Rattray et al.

[11] 3,717,529
[45] Feb. 20, 1973

[54] APPLICATION ASSEMBLY FOR TREAD BUILDING APPARATUS

[75] Inventors: William L. Rattray, Garden Grove; Bruce G. Brown, Corona, both of Calif.

[73] Assignee: AMF Incorporated

[22] Filed: March 1, 1971

[21] Appl. No.: 122,580

[52] U.S. Cl. .................156/130, 156/111, 156/396, 156/397, 156/405, 156/410, 156/413
[51] Int. Cl..........................B29h 17/02, B29h 17/20
[58] Field of Search......156/394, 111, 130, 396, 397, 156/405, 406, 410, 411, 413

[56] References Cited

UNITED STATES PATENTS

| | | | |
|---|---|---|---|
| 3,418,191 | 12/1968 | Dieckmann et al. | 156/130 X |
| 3,268,380 | 8/1966 | Guichon et al. | 156/130 |
| 2,655,321 | 10/1953 | Sternad et al. | 156/406 |

Primary Examiner—Robert F. Burnett
Assistant Examiner—C. B. Cosby
Attorney—George W. Price and Barry H. Fishkin

[57] ABSTRACT

Apparatus for applying tread rubber to bases of circular cross section, which comprises a central shaft, means for mounting a plurality of bases on the central shaft, means for rotating said shaft to advance the bases through a succession of stations, means mounted adjacent one of said stations for applying rubber to a base advanced to said stations, means mounted adjacent another of said stations for applying rubber to the base having the rubber thereon applied thereto at said one of said stations, the rubber applied at the two stations taken together forming the tread and sidewall rubber portions of a tire, and means mounted on said central shaft for stitching the rubber applied to the base at said one of said stations firmly to the base. Further means for applying extruded rubber to the base by advance of a roller, individually braked for severing the rubber, and means responsive to the movement of the roller to the base for actuating base rotation and extruder feed.

8 Claims, 7 Drawing Figures

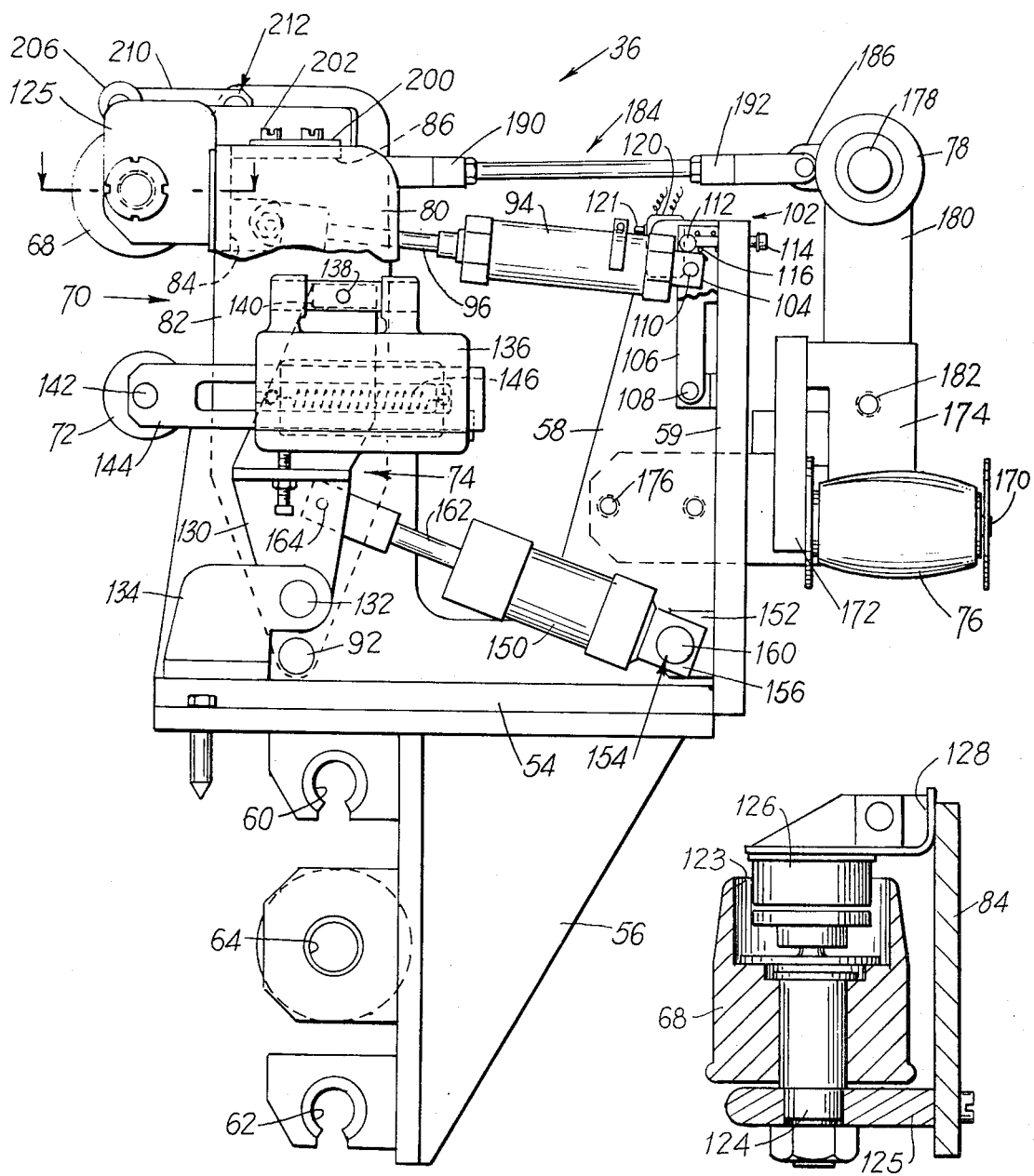
FIG. 3
FIG. 5
INVENTORS
WILLIAM L. RATTRAY
BRUCE G. BROWN
BY
ATTORNEY

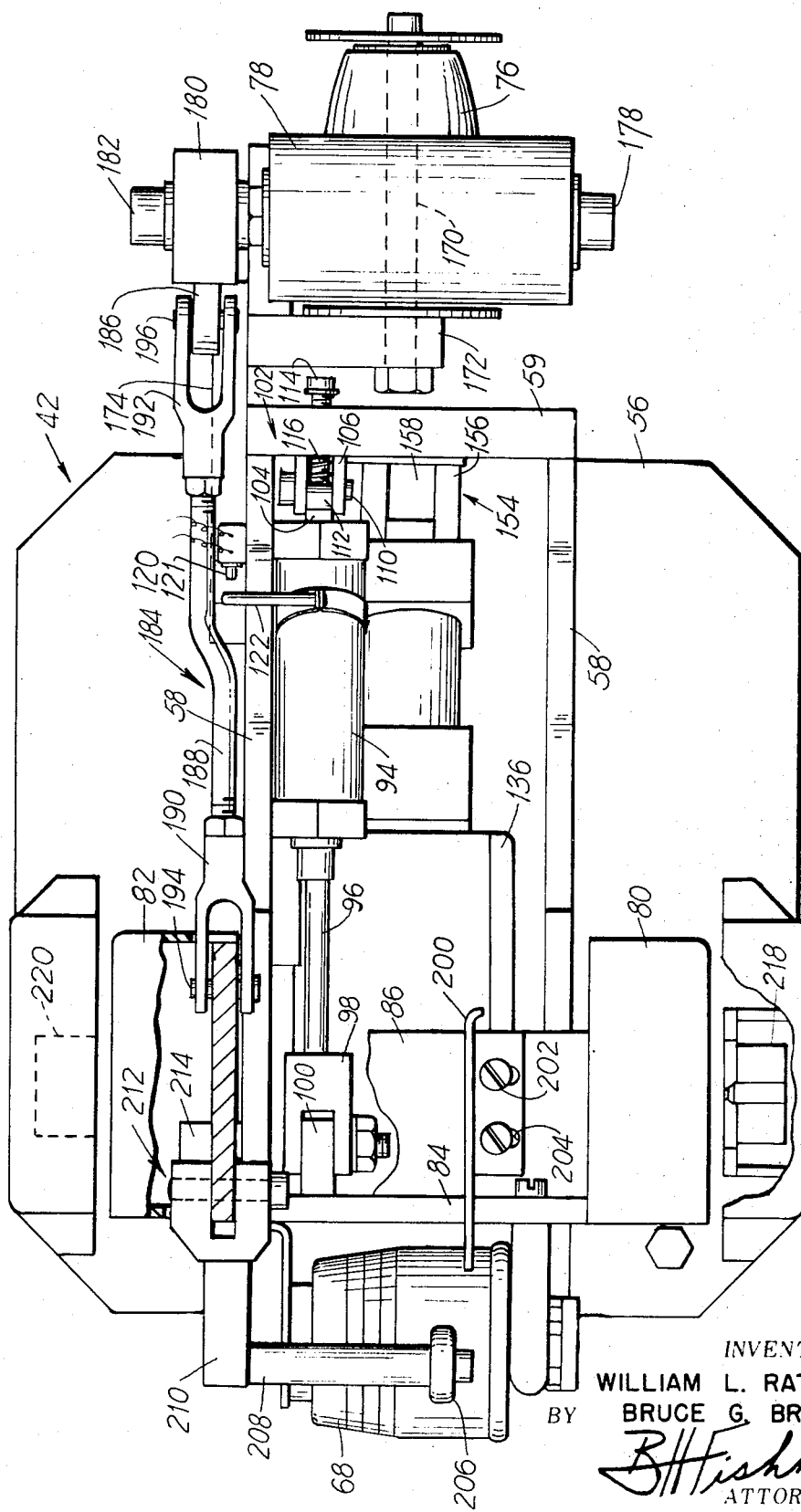

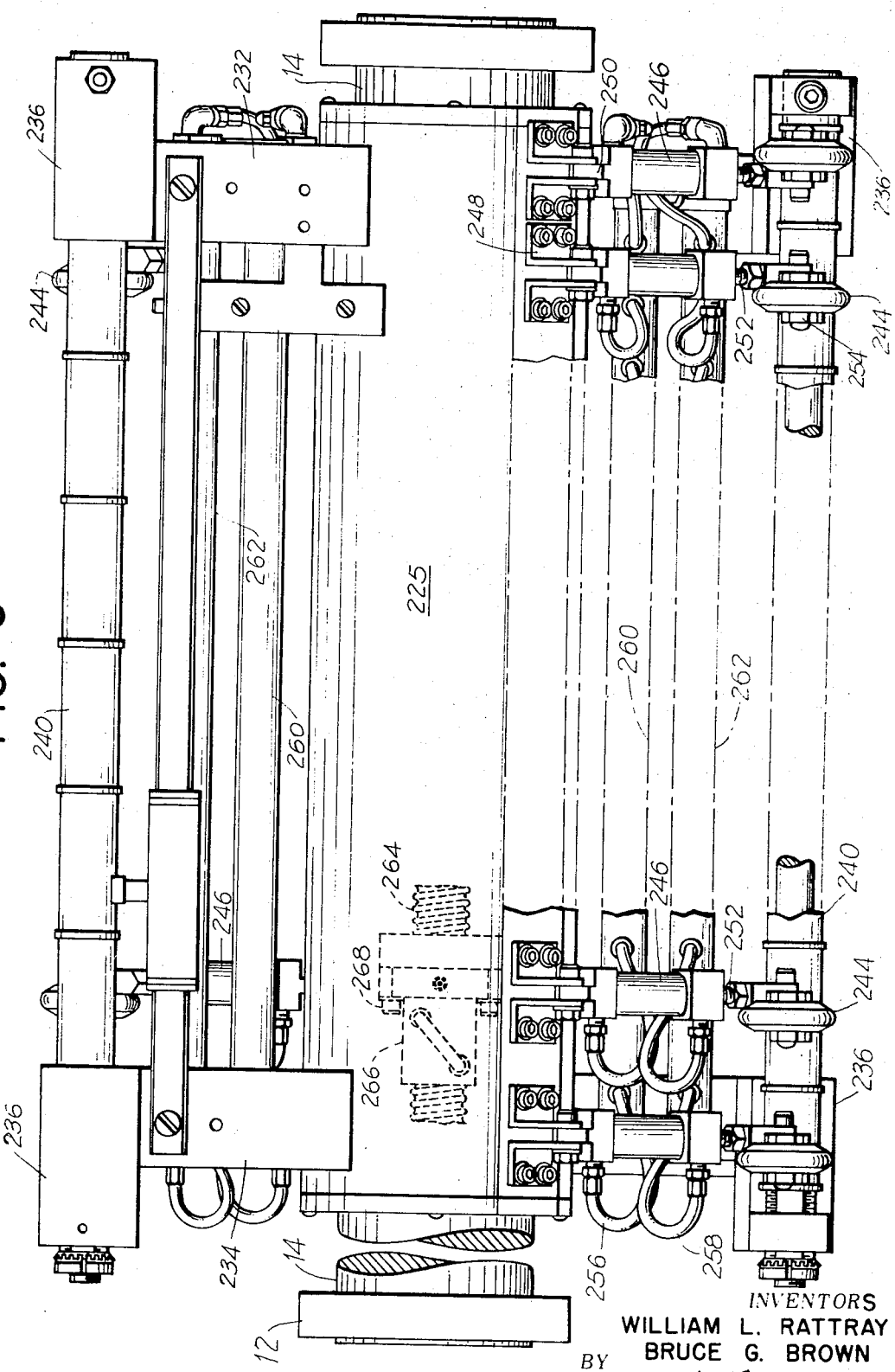

APPLICATION ASSEMBLY FOR TREAD BUILDING APPARATUS

BACKGROUND

This invention relates to apparatus for applying rubber to a base and more particularly to an automatic apparatus for applying a strip of rubber in a predetermined pattern to a succession of tire carcasses mounted on building drums.

The art of tire making has attained a certain maturity in that large and high volume apparatus have been developed and perfected. However, this apparatus generally suffers from severe problems in the material handling aspects of the machines, that is the storage and utilization of rubber prior to and in the tire building process, and still involves a great deal of hand labor.

More specifically, the present day operation involves shaping and joining the thread and sidewall at a location other than that where the tire is completed. There is usually one large extruder complex which makes all of the tread and sidewall stock for the entire plant. The treads and sidewalls are extruded to shape, joined and then cut to specified lengths for the particular tires which they will go on. These slabs of rubber are then inventoried in a special "book-shelf" type or portable rack which keeps each piece of rubber separate from the rest.

The slab of rubber is cut to a length equal to one circumference of the tire so that the final, tire building, operation involves wrapping the slab around a tire carcass one time to make a butt joint. The crucial factor in this operation is in the butt joint operation. Since the slabs of rubber, although cut to a precise length at the extruder line, will vary some due to rubber variations, the intelligence and judgment of a manual laborer is required to compensate for these length variations when the slab is applied to the tire carcass.

The instant apparatus solves the above problem by utilizing rubber in strip form, which can be supplied by a smaller extruder, and applying the strip in a series of turns to a circular base to form the rubber covering of a tire or similar article. The width and depth of the rubber covering is easily adjustable by controlling the number of and spacing between successive strips applied to the base.

However, previous strip winding apparatus have also involved some problems that inhibited its application to new tire manufacture. One of these problems has been air bubbles caught between adjacent strips of rubber, and in the fact that the strip winding process still required manual labor to start and stop the process — that is, the strip had to first be applied to the carcass by hand and at the end of the operation, the end of the strip had to be hand severed from the supply.

In addition, it was difficult to fabricate articles such as tires which required the application of two types of rubber to a base by the strip winding process, since existing processes necessitated that the tires be made on two machines, or in shifts on the same machine.

SUMMARY

It is therefore an object of this invention to provide an improved tire building method and apparatus utilizing strip rubber.

It is a further object of the invention to provide apparatus wherein two types of rubber may be rapidly and readily applied in strip form to a circular base in a desired pattern.

It is still a further object of this invention to provide tire building apparatus with an improved stitching assembly for better adherence of the rubber to a tire carcass.

It is yet another object of this invention to provide in a tire building apparatus an improved rubber application assembly adapted to initiate and terminate the rubber building process without manual assistance.

In accordance with these and other objects a preferred embodiment of the invention may comprise apparatus for applying rubber to circular bases, which comprises a circular base mounted for movement to a plurality of stations, means mounted adjacent at least one of said stations for applying rubber to a circular base at said station and means for stitching the rubber applied thereto, said stitching means being mounted for movement along the casing independently of the rubber application means.

DESCRIPTION OF THE DRAWINGS

FIG. 3 is a side elevation view of a rubber application head assembly that forms part of the apparatus shown in FIGS. 1 and 2.

FIG. 4 is a plan view of the assembly shown in FIG. 3.

FIG. 5 is a sectional view of an application roller, taken along line 5—5 of FIG. 4.

FIG. 6 is a side elevation view of a power stitching assembly that forms part of the apparatus shown in FIGS. 1 and 2.

DESCRIPTION OF THE PREFERRED EMBODIMENT

Figure 1:
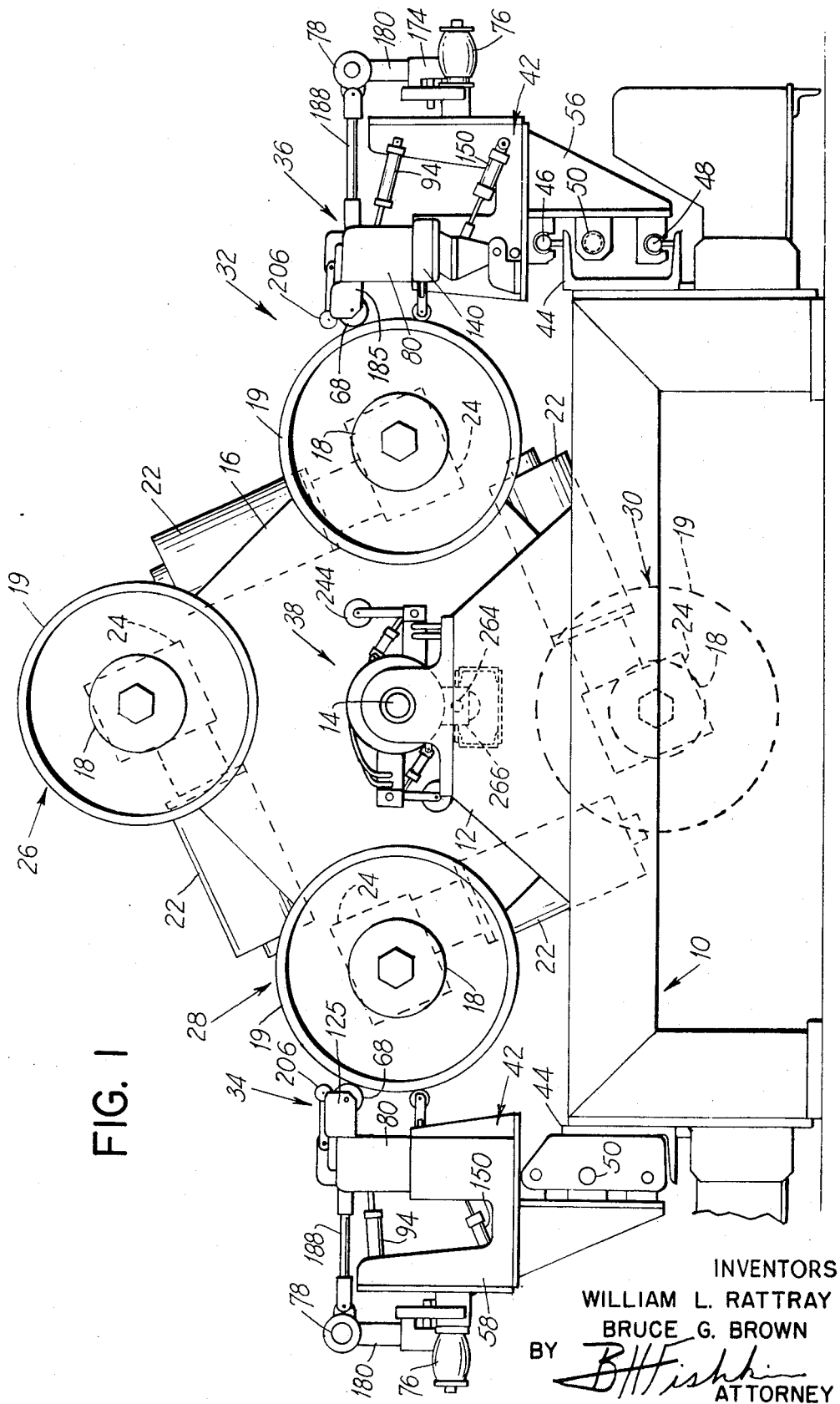
FIG. 1 is an end elevation view of the main portion of the apparatus according to the invention.
Figure 2:
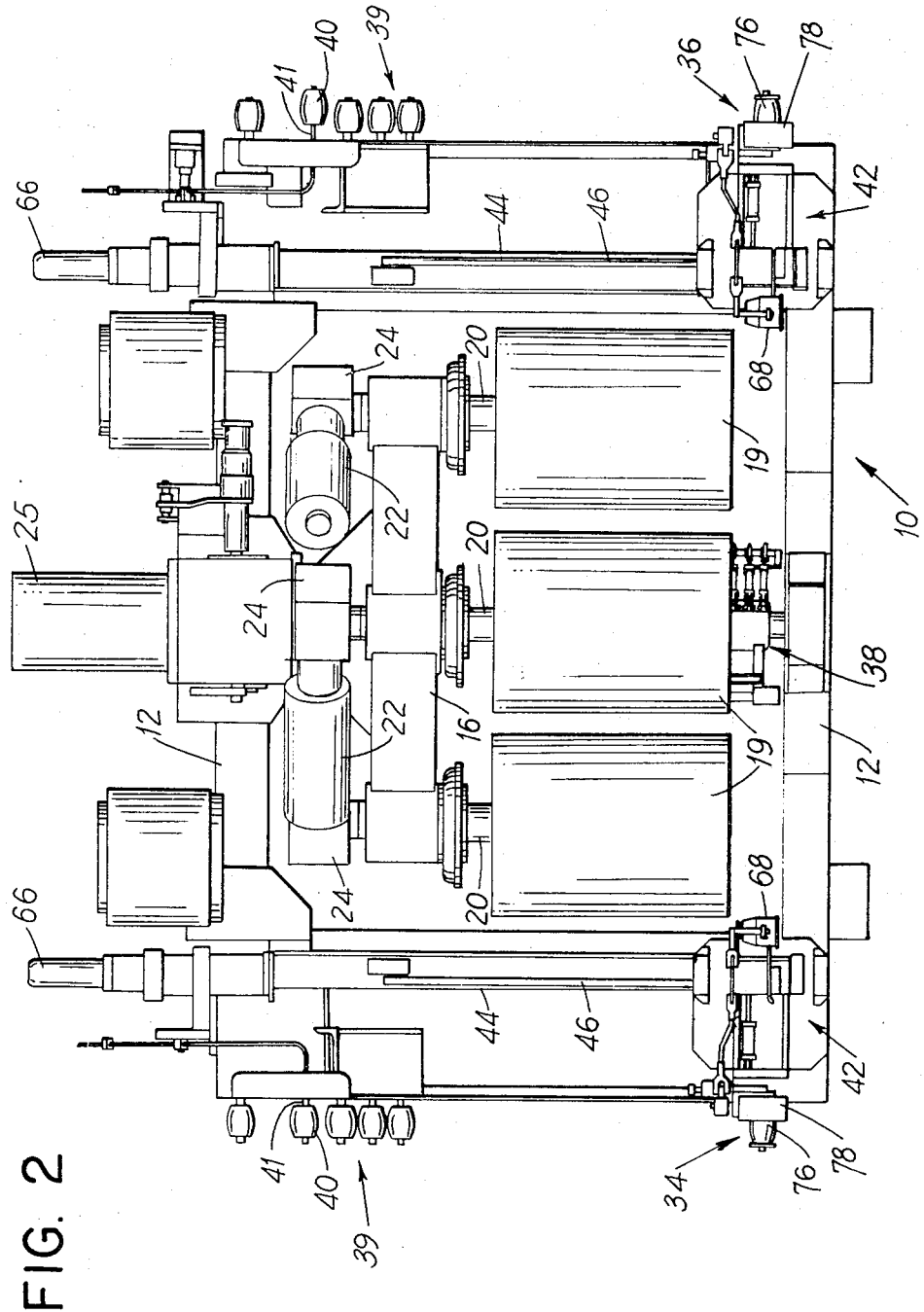
FIG. 2 is a plan view of the apparatus shown in FIG. 1.

For purposes of simplicity a preferred embodiment of the invention is shown and described herein as applying rubber directly to circular tire carcasses. However, it should be clear to those skilled in the art that the apparatus and method set forth hereinbelow are also applicable to the application of rubber to other circular bases.

With reference to the drawings, apparatus according to the invention may comprise a frame 10 having opposed mounting brackets 12 adapted to rotatably support a shaft 14 therebetween. A rectangular mounting plate 16 is mounted at one end of shaft 14 and is rotatable therewith.

A mounting assembly 18 including a drum 19 is mounted at each of the four corners of the rectangular plate 16. The drums 19 are collapsible by the mounting assemblies 18 for receiving tire carcasses and expandible to securely mount the carcasses thereon.

Each of the drums 19 is rotatable by a shaft 20 connected to a motor 22 by a suitable gear reduction assembly 24.

The motors 22 are operable to drive each shaft 20 at a plurality of speeds. A hydraulic motor 25 is provided for indexing the shaft 14 through a 360° cycle in 90° increments, each drum 19 thus being moved for four stations, designated 26, 28, 30 and 32 respectively. A Ferguson drive system 33 is provided between motor 25 and the shaft 14 so that precise 90° increments of rotation can be made.

At the first station, 26, tire carcasses are manually placed on and removed from the apparatus in conjunction with actuation of the mounting assembly 18. The second station, 28, is a rubber building station whereat a rubber application assembly 34 applies strip rubber supplied from an extruder (not shown) to the tire carcass which has been advanced thereto and is being rotated by the respective motor 22. The third station, 30, is a dwell station whereat the rubber applied at station 28 is allowed to cool and at the fourth station, 32, a second rubber application assembly 36 applies strip rubber of a different type, supplied from a second extruder (not shown), to the tire carcass which has been advanced thereto and is being rotated by the respective motor 22.

A power stitching assembly 38 is mounted on hub 14 for movement into engagement with the drums at the second and fourth station for firmly stitching the rubber strips applied thereto together and to the carcass.

The rubber strips applied to the rotating carcasses by the application assemblies 34 and 36 are supplied from two conventional strip rubber extruders, each providing a strip substantially of constant cross section at a substantially constant rate. The rate of feed of the extruder is approximately equal to the angular velocity of the rotating drum. Each strip is guided to its respective application assembly by a plurality of idler rollers 39 and a roller 40 mounted on a dancer arm 41.

The dancer arm 41 is connected to a rotary potentiometer (not shown) coupled to the control circuit for each of the motors 22. Thus the angular velocity of the spinning drum is variable in response to extruder output variation to avoid rubber strip starvation or glut.

Each of the rubber application assemblies 34 and 36 (FIGS. 3 and 4) are mounted on a carriage 42 for movement along a frame 44 positioned along the axis of the respective drums at the second and fourth stations. Since the rubber application assemblies, carriages and frames for the second and fourth stations are identical, only those for the fourth station will be set forth in detail hereinbelow, it being understood that the rubber application assembly, carriage and frame for the second station will be identical and facing in the opposite direction.

With reference to FIG. 1, the frame 44 includes a pair of vertically spaced shafts, 46 and 48 and a threaded rod 50 mounted in parallel spaced relationship thereto and positioned therebetween. The frame 44 is connected to frame 10 by a bracket 51.

The carriage 42 is mounted on the shafts 46 and 48 and rod 50. The carriage (FIG. 3) comprises a horizontal base 54 with a bracket 56 depending therefrom, a pair of spaced vertically extending members 58 mounted thereon and a vertically extending cross member 59 connected between the back of members 58.

A pair of recesses, 60 and 62, are provided in bracket 54 for receiving the rods 46 and 48 respectively and an internally threaded boss 64 is provided for accepting the threaded rod 50. The carriage is driven along the shafts 46 and 48 and rod 50 by the rotation of the threaded rod by an electric motor 66, which is mounted at one end of the rod and in axial alignment therewith.

The rubber application assembly 34 comprises an application roller 68 mounted for pivotal movement toward and away from the tire carcass on a pivoting assembly 70 and a plurality of stitching rollers 72 mounted for pivotal movement toward and away from the drum of a pivoting assembly 74. A transposition roller 76 and a directing roller 78 are included in the assembly 34 for guiding strip rubber from the idler rollers 39 to the application roller 68.

More specifically, the application roller pivoting assembly 70 includes a pair of spaced vertically extending members, 80 and 82, and vertical and horizontal cross plates 84 and 86 respectively, which join the vertical members 80 and 82 adjacent the tops thereof.

The assembly 70 is mounted for its pivotal movement on a shaft 92 that is mounted between the vertically extending carriage members and is pivoted on shaft 92 by an air cylinder 94, which includes a piston rod 96 extending therefrom. The piston rod includes a forked end member 98 which is connected to a lug 100 off vertical plate 84. The other end of air cylinder 94 is connected to the cross member 59 by a resilient connection 102.

The resilient connection 102 includes a lug 104 extending from the air cylinder and a double bracket 106 pivotally connected to the member 59 at 108 and extending upwardly therefrom to a position whereat its two members are positioned on either side of the lug 104, whereat a bolt 110 connects the lug and the double bracket 106. A pin 112 is mounted across the double bracket 106 and a rod 114 is mounted in cross member 59 in position to engage the pin 112. A spring 116 biases pin 112 and thus bracket 106 away from the cross member 59.

A sequence switch 120 having an actuator button 121 is mounted to an upright member 58. An actuator member 122 is mounted on air cylinder 94 in spaced relationship with the button 121.

In operation, upon actuation of the air cylinder 94, the piston rod 96 is extended and the pivoting assembly 70 and thus application roller 68 is advanced from the retracted position to the position shown in FIGS. 1 and 3, whereat the application roller is adjacent the tire carcass. In the latter position, rubber strip on the application roller will be transferred to the drum upon the rotation of the latter.

Actuation of the air cylinder, in addition to driving the application roller 68 to the drum, will cause the cylinder body to pivot bracket 110 in a clockwise direction, causing the actuator 122 to engage button 121 of the sequence switch 120.

The sequence switch is connected to the control circuits for the extruder and the motor 22. With the actuation of the sequence switch the extruder will start and the motor 22 will start, spinning the drum. After an interval predetermined by the time required to allow the drum to reach a predetermined angular velocity, the air cylinder 94 is deactivated and the application roller 68 is retracted, serving to guide the strip to the spinning carcass.

With reference to FIG. 5, the application roller 68 is provided with a recess 123 therein. The roller is mounted for free rotation on a shaft 124 that is supported by a bracket 125 mounted on the vertical cross plate 84 of the pivoting assembly 70. A magnetic brake 126 is mounted to a bracket 128 that is mounted to the cross plate 84 in spaced relationship with bracket 125. The brake 126 extends from bracket 128 into the recess 123 in the application roller 68 and is operable to stop the rotation of the roller upon the actuation thereof.

The stitching rollers pivoting assembly 74 includes a shaped vertically extending member 130 mounted on a shaft 132 that is pivotally mounted between a pair of brackets 134 positioned on horizontal base 54. A stitcher support housing 136 is mounted for free pivotal movement about a rod 138 mounted to the support member 130 by a cantilevered horizontal bar 140. Each stitching roller 72 is mounted for free rotation on a shaft 142 supported on a horizontally extending arm 144. The arms 144 are mounted in the support 136 and are biased outwardly toward the drum by springs 146. The independent mounting of the stitching rollers 72 and the pivotable mounting of the support housing 136 provide capability for the stitching rollers to conform to and remain in pressing contact with the rubber on the tire carcass as the assemblies 34 and 36 are indexed along the axis of the drum.

The stitching roller pivoting assembly is pivoted by an air cylinder 150 that is pivotally connected to one end thereof to a bracket 152 by a pivotal connection 154 located on the lower portion of cross member 59. The pivotal connection 154 includes a forked shaped lug 156 mounted on the air cylinder, a bracket 158 mounted on the cross member and extending between the tines of the fork shaped lug and a pin 160 passing through the bracket and the lug. A piston rod 162 extends from the other end of air cylinder 150 and is pivotally connected to the support 140 at 164. In operation, upon actuation of the air cylinder 150, which is actuated simultaneously with air cylinder 94, the stitching rollers will be advanced from a retracted position to the extended position adjacent the drum shown in FIGS. 1 and 3. The stitcher rollers remain in contact with the rubber on the drum after the applicator roller is retracted.

The directing roller 78 is mounted for free rotation on a shaft 170 that is cantilevered from a bracket 172. The bracket 172 is welded to a shaped bracket 174 that is mounted to one of the vertically extending members 58 by screws 176. The transposition roller 76 is mounted for free rotation on a shaft 178 that is cantilevered from an arm 180 that is pivotally mounted to shaped bracket 174 at 182.

The transposition roller 76 is mounted for movement along with the application roller 68 by a linkage 184 connecting arm 180 and vertically extending support 82. The linkage 184 includes a lug 186 mounted on arm 180, a link 188 having fork shaped members 190 and 192 on either end thereof, a pin 194 connecting the fork shaped member 190 to the inside wall of vertical member 82 and a pin 196 connecting fork shaped member 192 to lug 186. Thus, upon actuation of air cylinder 150 both the application roller 68 and the transposition roller 76 will be withdrawn with respect to the drum.

A guide member 200 is mounted to horizontal plate 84 to guide the strip of rubber from the transposition roller 76 to the application roller 68. The guide member is connected to the plate by a pair of screws 202 that pass through slots 204 in a flange of the guide member such that the position of the guide may be positioned for varying rubber strip widths.

A sensing roller 206 is mounted just above the application roller 68 by a rod 208 cantilevered from an arm 210 that is pivotally connected to the inside wall of vertical support 82 at 212. A linear voltage differential transducer 214 is mounted inside the vertical support 82, and coupled to arm 210. The sensing roller 206 rides on the rubber strip passing over the application roller 68 and the thickness of the strip passing thereunder is determined by the transducer in accordance with the angular position of the arm 210. The signal from the transducer is utilized to monitor the thickness of the rubber strip and display the ribbon thickness on a gauge (not shown) displayed on the extruder control.

A photocell 218 is mounted in the vertical support 80 and a corresponding member 220 is mounted in vertical support 82 to receive the beam. The beam will make when the pivoting assemblies 70 and 74 have retracted both the application roller 68 and the stitching rollers 72.

Figure 7:
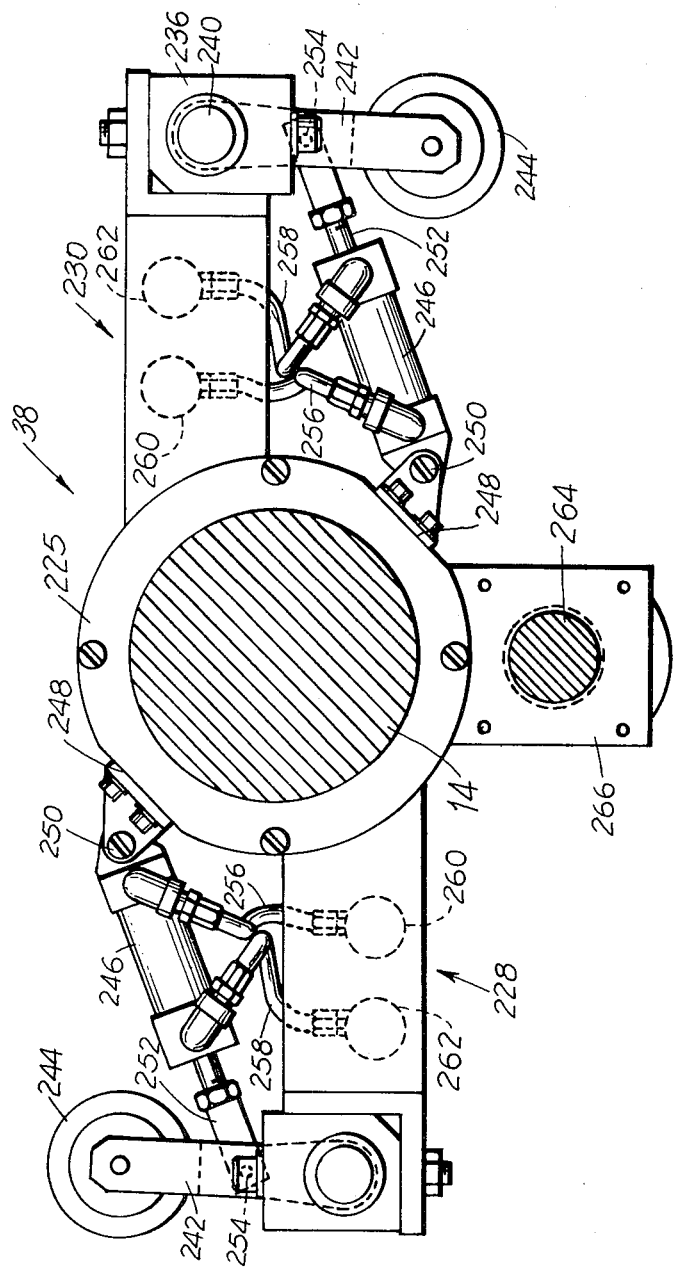
FIG. 7 is an end view of the assembly shown in FIG. 6.

With reference to FIGS. 6 and 7, the power stitching assembly 38 includes a sleeve 225 mounted for slidable movement on shaft 14 and a pair of stitching heads 228 and 230 mounted on sleeve 225 and extending toward a respective one of the second station 28 and fourth station 32.

Each of the stitching heads 228 and 230 comprises a pair of horizontal beams 232 and 234 extending from the sleeve 225 adjacent the ends thereof. A mounting bracket 236 is affixed to the end of each of the beams 232 and 234 and a rod 240 is mounted between the brackets 236. A plurality of arms 242 are pivotally mounted to the rods 240 and a stitching roller 244 is mounted for free rotation on the end of each of the arms 242.

Each of the arms 242 is pivoted by an air cylinder 246 mounted between the sleeve 225 and the arm. Each cylinder is pivotally connected to a bracket 248 bolted to the sleeve, as at 250. A piston rod 252 extends from the other end of each of the air cylinders and is pivotally connected to the respective stitching roller arms at 254. A pair of air hoses 256 and 258 are connected to the respective ends of each of the air cylinders and actuate the piston rod outward and inward respectively in the air cylinder. The air hoses 256 are all supplied from an air manifold 260 mounted between the horizontally extending beams 232 and 234 and the air hoses 258 are actuated from another air manifold 262 mounted between the horizontally extending beams in parallel spaced relationship with the air manifold 260.

The outward stroke of the piston rods 252 drive the stitching rollers into engagement with the rubber applied to the respective drums at the second and fourth stations and the inward stroke returns the stitching rollers to their inactive positions shown in FIGS. 1, 2, 6 and 7.

The sleeve 225 is slidable on shaft 14 and is driven therealong by a Saginaw screw 264 mounted in spaced relationship with the shaft 14 and threadedly mounted in a Saginaw nut 266 that is bolted to the sleeve by bolts 268. The Saginaw screw is powered by a reversible DC motor (not shown) such that the sleeve is movable along the shaft in both directions. The amplitude of the movement of the sleeve is slightly greater than the distance between the stitching rollers so that the stitchers cover a broad area of the drums. The sleeve is driven in a first direction to power stitch and is driven backward to its start position during the ninety degree indexing operation at the end of the step.

In operation, the apparatus is controlled by a logic system including punched tape control for the configuration of rubber applied by the application assemblies. More specifically, in a typical sequence a tire carcass is loaded on a collapsed drum 19 at first station 26 and the mounting assembly 18 is actuated to expand the drum to securely mount the drum thereon. At a predetermined time, the operation of motor 25 is initiated and the Ferguson drive 33 indexes the drum 19 to the second station 28. The rubber application assembly 34 mounted at the second station is then actuated. This involves the actuation of air cylinders 94 and 150, which drives the application roller 68 and the stitching rollers 72 into position adjacent the drum. A strip of rubber is left extending from the extruder to the application roller at the end of each rubber application cycle, so that when the cylinder 94 is actuated at the start of the next cycle the end of the rubber strip will be driven into engagement with the tire carcass on the drum by the application roller.

The actuation of air cylinder 94 also actuates the sequence switch 120 to start the extruder feed and actuate motor 22 to spin the drum. The rotary movement of the tire carcass on the drum picks the rubber strip from the application roller. After a predetermined time delay to allow the ribbon to be properly attached to the tire carcass, the air cylinder 94 is de-activated and the application roller swings back to a position spaced from the drum, where it serves to guide the rubber strip thereto.

The rubber application assembly carriage 42 is then indexed down the frame 44 by motor 66 in accordance with a pattern predetermined by the punched tape whereupon a series of overlapping layers is wrapped about the drum in a predetermined pattern.

After the rubber application assembly has applied the first length of rubber to the tire carcass on the drum, the punched tape control actuates the brake 126, breaking the strip at the application roller, halts the extruder feed, de-activates the motor 22, and retracts the stitching rollers 72. This leaves the strip extending from the extruder to the application roller in preparation for the next rubber application cycle. The application roller is then driven down the drum axis to the predetermined point where the application of the second length of rubber is to be initiated and the sequence described hereinabove is repeated.

At the end of the second rubber application sequence, when the stitcher unit 74 is driven back by air cylinder 150, the making of the light beam provided by photocell 218 prepares the control circuit for the power stitching sequence and actuates motor 66 to drive the application assembly back down frame 44 to its start position.

The initiation of the power stitching sequence involves the supplying of air through the air manifold 260 and the air hoses 256 to drive the piston rods 252 outwardly. This causes the stitching rollers 242 to engage the rubber just applied to the rotation drum. At the same time, the drum is spun at a higher angular velocity. The motor driving the Saginaw screw 264 is then actuated and the sleeve 225 is driven own the shaft 14 a distance slightly greater than the distance between the stitching rollers. The combination of the pressure, of the stitching rollers 242, high speed drum rotation and lateral movement of the stitching rollers provides a strong force pressing the rubber strips together and against the tire carcass to remove air from the interfaces between the strips and between the strips and the drum.

At the end of the power stitching sequence, the stitching rollers are driven back to their inactive position by supplying air through manifold 262 and air hoses 258 to the air cylinders 246. The Saginaw screw then drives the sleeve 225 back to its start position and the motor 25 is then pulsed again by the punched tape control and the drum is driven 90° to the third station 30 whereat it is allowed to dwell to permit the rubber thereon to cool.

At the end of the dwell period the motor 25 is pulsed to drive the drum to the fourth station 32 whereat the rubber application assembly 36 is actuated by the punched tape control. The rubber application assembly 36 operates in a mode identical to the rubber application assembly 32. However, a different type of rubber is applied to the tire carcass in the drum at the fourth station and the punched tape program directs the rubber to the middle portion of the drum not covered at the second station. At the termination of the rubber application sequence the power stitching sequence is again initiated to firmly adhere the rubber to the tire carcass.

At the conclusion of the power stitching sequence the motor 25 is again pulsed and the drum is rotated back to the first station where the drum is collapsed by actuation of the mounting assembly 18 enabling the carcass to be removed therefrom and a new carcass placed thereon, preparatory to a new 360° cycle.

Of course, the plate 16 mounts four drums 19 so that four drums are being operated upon at any given moment and while one drum is at the second station having rubber applied to the tire carcass thereon, a drum at the fourth station for the application of the remainder of the rubber thereon and the power stitching assembly is provided with two stitching assembly is provided with two stitching heads such that the rubber on the tire carcasses at the second and fourth stations are power stitched at the same time.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be con-

We claim:

1. In apparatus for applying strip rubber from an extruder to a base having a circular cross section, a rubber application assembly which comprises:
   a carriage mounted for movement parallel to the axis of the base,
   an application roller mounted for free rotation on said carriage,
   means for moving the application roller towards and away from said circular base, and
   means for braking the rotation of the application roller.

2. Apparatus according to claim 1, further comprising:
   a support mounted on said carriage,
   a plurality of stitching rollers independently mounted to said support, and
   means for moving said stitching roller support toward and away from the circular base.

3. Apparatus according to claim 1, further comprising:
   means responsive to the movement of the application roller to the circular base for actuating base rotation and extruder feed.

4. Apparatus according to claim 2, further comprising:
   means responsive to the movement of the application roller to the circular base for actuating base rotation and extruder feed.

5. A method of applying strip rubber from an extruder to a base having a circular cross section, comprising the steps of:
   directing the rubber strip to an application roller,
   driving the application roller and rubber strip thereon into engagement with the base,
   actuating rotation of the base in response to the driving of the application roller thereto to pick the strip from the application roller and transferring it to the rotating base, and
   severing the strip after a predetermined amount of rubber has been applied to the rotating base.

6. A method according to claim 5, further including the step of:
   retracting the application roller from the base after the rubber strip has been transferred thereto, the application roller now guiding the rubber strip to the base, and
   moving the application roller parallel to the axis of the base to cover a predetermined portion thereof.

7. A method according to claim 5, wherein the step of severing the strip comprises braking the rotation of the application roller.

8. In apparatus for applying strip rubber from an extruder to a base having a circular cross-section, a rubber application assembly which comprises:
   a carriage mounted for movement parallel to the axis of the base,
   an application roller mounted for free rotation on said carriage,
   means for moving the application roller towards and away from said circular base,
   means for extruding a strip of rubber,
   means for rotating the base, and
   means responsive to the movement of the application roller to the base for actuating base rotation and extruder feed.

* * * * *